United States Patent
Kim et al.

(10) Patent No.: US 10,789,114 B2
(45) Date of Patent: Sep. 29, 2020

(54) MULTIPLE AUTOMOTIVE MULTI-CORE PROCESSOR ERROR MONITORING DEVICE AND METHOD

(71) Applicant: HYUNDAI AUTRON CO., LTD., Seoul (KR)

(72) Inventors: Kee Beom Kim, Seongnam-si (KR); Young Suk Kim, Yongin-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 137 days.

(21) Appl. No.: 16/208,454

(22) Filed: Dec. 3, 2018

(65) Prior Publication Data

US 2019/0179693 A1 Jun. 13, 2019

(30) Foreign Application Priority Data

Dec. 8, 2017 (KR) .................. 10-2017-0168624

(51) Int. Cl.
*G06F 11/07* (2006.01)
*G06F 11/30* (2006.01)

(52) U.S. Cl.
CPC ...... *G06F 11/0757* (2013.01); *G06F 11/0724* (2013.01); *G06F 11/0772* (2013.01); *G06F 11/0787* (2013.01); *G06F 11/3024* (2013.01)

(58) Field of Classification Search
CPC .. G06F 11/07; G06F 11/0757; G06F 11/0724; G06F 11/0772; G06F 11/0787; G06F 11/30; G06F 11/3024
USPC .......................................................... 714/48
See application file for complete search history.

(56) References Cited

U.S. PATENT DOCUMENTS

| | | | |
|---|---|---|---|
| 4,411,577 A * | 10/1983 | Shearer, Jr. | B65G 1/0421 340/522 |
| 9,817,741 B2 * | 11/2017 | Mucke | H04L 43/10 |
| 2006/0229777 A1 * | 10/2006 | Hudson | G05B 23/021 701/31.4 |

(Continued)

FOREIGN PATENT DOCUMENTS

| KR | 10-0611104 B1 | 8/2006 |
|---|---|---|
| KR | 10-2013-0081425 A | 7/2013 |
| KR | 10-1646210 B1 | 8/2016 |

*Primary Examiner* — Kamini B Patel
(74) *Attorney, Agent, or Firm* — Morgan, Lewis & Bockius LLP

(57) ABSTRACT

Provided is a multi-core processor error monitoring system including: first and second multi-core processors; and an error monitoring processor configured to monitor the first and second multi-core processors. The error monitoring processor includes a monitoring module and a first buffer and a second buffer. The monitoring module is connected to the first multi-core processor through a first path not passing through the first buffer and a second path passing through the first buffer. The monitoring module calculates and monitors a communication characteristic with the first multi-core processor including a communication speed and a delay rate in a bypass mode in connection with the first multi-core processor through the first pass. The monitoring module measures a read and write time of the first buffer in a QoS mode in connection with the first multi-core processor through the second pass to calculate a communication time with the first multi-core processor.

20 Claims, 4 Drawing Sheets

(56) References Cited

U.S. PATENT DOCUMENTS

| | | | |
|---|---|---|---|
| 2007/0124113 A1* | 5/2007 | Foslien | G05B 23/024 |
| | | | 702/185 |
| 2007/0283188 A1* | 12/2007 | Balzer | F02D 11/107 |
| | | | 714/26 |
| 2008/0312790 A1* | 12/2008 | Fey | B60W 50/023 |
| | | | 701/38 |
| 2018/0026896 A1* | 1/2018 | Szilagyi | H04W 28/0268 |
| | | | 370/235 |
| 2019/0155679 A1* | 5/2019 | Kim | G06F 11/3024 |
| 2019/0258251 A1* | 8/2019 | Ditty | G06K 9/00805 |

* cited by examiner

MULTIPLE AUTOMOTIVE MULTI-CORE PROCESSOR ERROR MONITORING DEVICE AND METHOD

CROSS-REFERENCE TO RELATED APPLICATIONS

This U.S. non-provisional patent application claims priority under 35 U.S.C. § 119 of Korean Patent Application No. 10-2017-0168624, filed on Dec. 8, 2017, the entire contents of which are hereby incorporated by reference.

BACKGROUND

The present invention relates to a multiple automotive multi-core processor error monitoring device and method, and more particularly, to a multiple automotive multi-core processor error monitoring system and method for monitoring errors and causes of errors in each of a plurality of vehicle multi-core processors.

Recently, automobiles use many electronic control devices with built-in microcontroller unit, and their use is gradually increasing. The microcontroller unit in a vehicle plays an important role in controlling the functions of each device of the vehicle.

However, there are cases where a function stop occurs sometimes due to malfunction or abnormal signal occurrence in the microcontroller unit. Since malfunction of a microcontroller unit may seriously affect the safety of riders, it should always operate normally. Therefore, it is necessary to periodically check whether the microcontroller unit is operating normally.

Generally, a watchdog is used to monitor the abnormality of the microcontroller unit. For example, there are a period watchdog periodically checking the trigger signal, a window watchdog with a time window of the trigger signal, and a Q & A watchdog to answer a given question.

More specifically, during normal operation, the system periodically transmits queries to the microprocessor, and starts watchdog timer periodically in order to prevent the response time elapse or time out.

If the processor fails to restart the watchdog due to a hardware defect or a program error, the timer generates a timeout signal over time. This timeout signal is used to take several corrective actions. This corrective action generally involves keeping the system in a safe state and restoring it to normal operation.

The watchdog timer is commonly found in computer control equipment, which is difficult for humans to access or respond to errors in a timely manner. If the software stops, many embedded systems may not rely solely on rebooting by a user. Therefore, these embedded systems must be self-supporting. For example, remote embedded systems such as space explorers may not be physically accessed by human operators. If the system may not automatically recover the errors, they may be permanently corrupted. The watchdog timer is usually used in such cases.

FIG. 1 shows a block diagram of an error monitoring system of a processor according to the prior art.

In the past, in order to monitor the normal operation of the processing core (or processor), the watchdog timer is variably set in the watchdog processor 200, and upon receiving the watchdog timer (WDT) pulse signal from the processing core 100 within the corresponding time, it is determined that there is no problem in the operation of the processing core 100.

If the WDT pulse signal is not received from the processing core 100 within the time set in the WDT, the watchdog processor 200 resets the processing core 100. In the conventional error monitoring technology for the processing core 100, it is impossible to grasp which core has a problem in a multi-core system.

In addition, in conventional multi-core systems with a plurality of watchdog processors and any number of processors, the watchdog processor performs operations to monitor other processors. However, if errors occur in particular processor, the error monitoring technique is not able to grasp the specific cause of error occurrence. For example, a watchdog processor may not determine whether an error that occurs on a particular processor is an arithmetic error or a communication error.

SUMMARY

The present invention has been made to solve the above-mentioned technical problems, and it is an object of the present invention to substantially complement various problems caused by limitations and disadvantages in the prior art, and the present invention provides a multiple processor error monitoring systems and method for monitoring error and error causes of each of a plurality of processors, and provides a computer-readable recording medium having recorded thereon a program for executing the method.

An embodiment of the inventive concept provides a multi-core processor error monitoring system including: first and second multi-core processors; and an error monitoring processor configured to monitor the first and second multi-core processors, wherein the error monitoring processor includes a monitoring module and a first buffer and a second buffer, wherein the monitoring module is connected to the first multi-core processor through a first path not passing through the first buffer and a second path passing through the first buffer, wherein the monitoring module calculates and monitors a communication characteristic with the first multi-core processor including a communication speed and a delay rate in a bypass mode in connection with the first multi-core processor through the first pass, wherein the monitoring module measures a read and write time of the first buffer in a Quality of Service (QoS) mode in connection with the first multi-core processor through the second pass to calculate a communication time with the first multi-core processor.

In an embodiment, the error monitoring processor may transmit an error detection signal to the first multi-core processor and store a transmission time point as a data processing request time point, wherein the first multi-core processor may include a first processor and a second processor, and transmit a predetermined data processing result, which is obtained by performing by the first processor and the second processor based on the error detection signal, to the error monitoring processor as a response, wherein the error monitoring processor may store the predetermined data processing result response reception time and calculate an actual operation processing time based on the response reception time and the data processing request time point to monitor the communication characteristic.

In an embodiment, the error monitoring processor may calculate an operation time and a communication time based on the actual operation processing time and the communication time calculated in the QoS mode, and compare the operation time and the communication time with a predetermined operation request time and a communication request time to check whether it is an operation error or a communication error.

In an embodiment, in the case of the operation error or the communication error, the error monitoring processor may increment an error counter.

In an embodiment, the error monitoring processor may increment the error counter by changing a weight according to the operation error or the communication error.

In an embodiment, if the actual operation processing time is greater than a predetermined operation request time, the error monitoring processor may convert a bypass mode to a QoS mode and performs error monitoring.

In an embodiment, the delay rate in the bypass mode may be calculated based on the actual operation processing time and the number of responses to a data processing request from a specific time point.

In an embodiment, the communication speed in the bypass mode may be calculated based on a system operating frequency, the number of responses to a data processing request from a specific time point, a data bit of input data, and a time required for monitoring.

In an embodiment, in the QoS mode, the communication time may be calculated based on a time point at which the first buffer overflows when the error monitoring processor needs to monitor data received from the first multi-core processor.

In an embodiment, in the QoS mode, the communication time may be calculated based on a time point at which the first buffer underflows when the error monitoring processor needs to monitor a data read operation of the first multi-core processor.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

The following content merely illustrates the principles of the invention. Therefore, those skilled in the art will be able to devise various devices which, although not explicitly described or illustrated herein, embody the principles of the invention and are included in the concept and scope of the invention. Furthermore, all of the conditional terms and embodiments listed herein are, in principle, intended to be purely for purposes of understanding the concepts of the invention, and are not to be construed as limited to the specifically recited embodiments and conditions.

The above objects, features and advantages will be described in detail below with reference to the accompanying drawings, and accordingly, those skilled in the art may easily implement the technical idea of the present invention.

Figure 1:
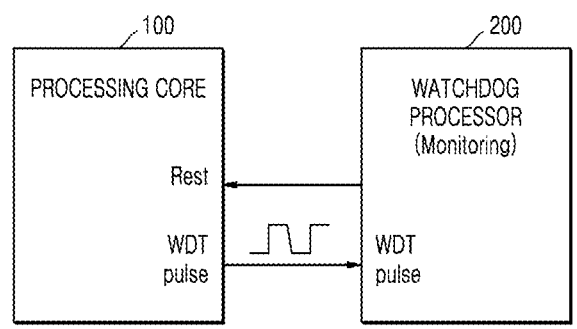
FIG. 1 shows a block diagram of an error monitoring system of a processor according to the prior art.
Figure 2:
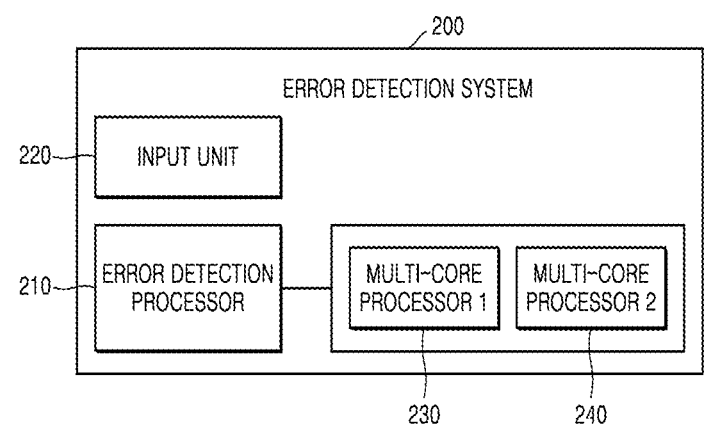
FIG. 2 is a block diagram of a multiple processor error monitoring system according to an embodiment of the present invention.

FIG. 2 is a block diagram of a multiple processor error monitoring system according to an embodiment of the present invention.

The error monitoring system 200 according to an embodiment of the present invention includes an input unit 220, an error monitoring processor 210, and a plurality of multi-core processors 230 and 240.

The error monitoring system 200 according to an embodiment of the present invention further includes communication means for interconnecting the plurality of multi-core processors 230 and 240 and the error monitoring processor 210. The communication means may be, for example, a communication means such as a Serial Peripheral Interface (SPI), a Controller Area Network (CAN) bus, or a Local Interconnect Network (LIN).

The input unit 220 may receive data necessary for monitoring, such as a system operation request time, a system operation frequency, and communication data, from the outside. This is because, when monitoring multiple systems, each system may include different operating requirements for each multi-core processor.

The plurality of multi-core processors 230 and 240 may include, for example, a first multi-core processor 230 and a second multi-core processor 240.

In this case, the plurality of multi-core processors may be processors controlling different systems. For example, the first multi-core processor 230 may be a multi-core processor 230 of a motor controller of a hybrid vehicle (HEV) and the second multi-core processor 240 may be a multi-core processor 240 of an automotive engine controller. Alternatively, the first multi-core processor 230 may be a processor of a vehicle controller (VCU) of an electric vehicle (EV) and the second multi-core processor 240 may be a microcontroller unit (MCU) of an electric vehicle (EV).

In addition, the first multi-core processor 230 may include a first plurality of processors 320 and 330 and the first multi-core processor 230 may include a second plurality of processors 340 and 350. In this case, the first plurality of processors 320 and 330 and the first plurality of processors 320 and 330 may be a plurality of cores of the respective multi-core processors 230 and 240.

Figure 3:
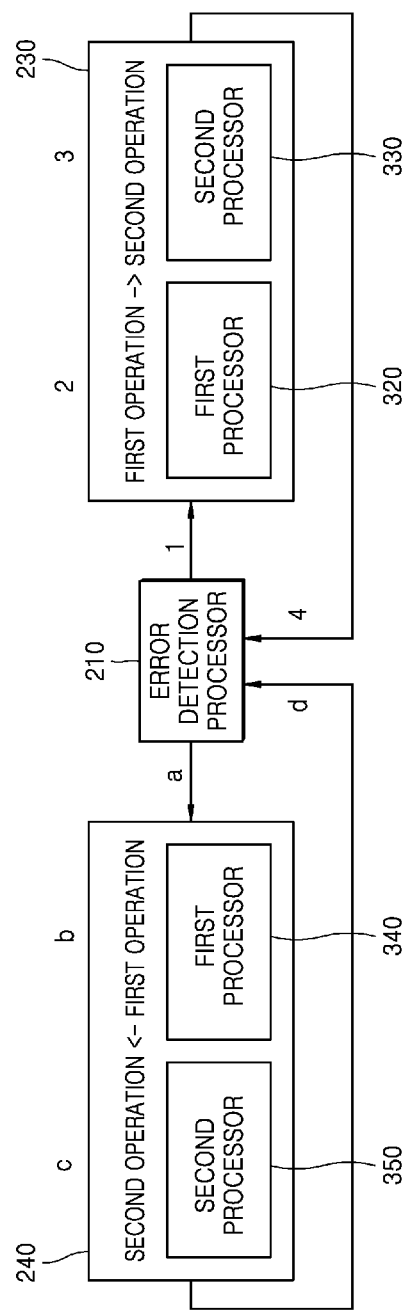
FIGS. 3 and 4 show the operation of a multiple processor error monitoring system according to an embodiment of the present invention.

Referring to FIG. 3, the error monitoring processor 210 monitors errors of the plurality of multi-core processors 230 and 240. Specifically, the error monitoring processor 210 transmits an error monitoring signal including a query to the plurality of multi-core processors 230 and 240.

The plurality of multi-core processors 230 and 240 perform an operation on each query, and return a data processing result to an error monitoring processor as an error monitoring response. Preferably, each of the processors 320, 330, 340, and 350 of the multi-core processors 230 and 240 performs an operation on each query.

For the simple description, the first multi-core processor 230 will be described. However, since the monitoring operation and the configuration of the second multi-core processor 240 are the same as those of the first multi-core processor 230, a description thereof will be omitted. However, those skilled in the art will be able to implement the operation of the second multi-core processor 240 with reference to the operation and configuration of the first multi-core processor 230.

The error monitoring processor 210 according to an embodiment of the present invention transmits an error monitoring signal to the first processor 320. The error monitoring signal is generated through a method of using a "reserved" area of a predetermined communication data protocol, using data bits in a predetermined communication data protocol, adding some bits to a predetermined communication data protocol, or assigning additional pins to the error monitoring system.

The first multi-core processor 230 receives an error monitoring signal including a query from the error monitoring processor 210, and after performing an operation on the query in each of the first processor 320 and the second processor 330, sends the data processing result to the error monitoring processor 210.

In this case, the error monitoring processor 210 may store the communication data input time point and output time point of the error monitoring processor 210 as time stamps. Also, the error monitoring processor 210 stores a data processing request time point (Task Request, see a and 1 in FIG. 3) and a response time point (Task Response, see d and 4 in FIG. 3) for a data processing request as a time stamp in the first multi-core processor 230.

Finally, the error monitoring processor 210 at least stores the time point of data input/output to a monitoring system, the data processing request time, the data processing result response time point, and the error output time point and, by using this, monitors the communication speed, the delay rate, and the Quality-of-Service (QoS).

Hereinafter, the detailed operation of the error monitoring processor 210 according to an embodiment of the present invention will be described with reference to FIG. 4.

The error monitoring processor 210 according to an embodiment of the present invention may include a monitoring module 410 and buffers 420 and 430.

The monitoring module 410 may include a monitoring unit 413 and a storage unit 415. At this time, the monitoring unit 413 may monitor each of the multi-core processors 230 and 240 in the following two modes. In addition, the storage unit 415 may receive data required for monitoring, such as a predetermined system operation request time, a system operation frequency, and communication data, from an external source, and store them.

At this time, the system operation request time includes a reference time between the total response request time (1+2+3+4 in FIG. 3), for example, from the above-mentioned data processing request time to the data processing request response time point. Also, the system operation request time may include the communication request time 1 and 4 and the calculation request time (2+3) during the entire response request time.

Meanwhile, the buffers 420 and 430 are for measuring the communication time in the QoS mode to be described below, and may preferably be a 2-dimensional (2D) buffer.

The monitoring module 410 and the plurality of multi-core processors 230 and 240 are connected by two paths. Herein, for the simple description, the first multi-core processor 230 will be described. However, since the monitoring operation and the configuration of the second multi-core processor 240 are the same as those of the first multi-core processor 230, a description thereof will be omitted. However, those skilled in the art will be able to configure the operation of the second multi-core processor 240 with reference to the operation and configuration of the first multi-core processor 230.

The monitoring module 410 and the first multi-core processor 230 may be connected through a first path 450 and a second path 453. In this case, the second path 453 passes through the buffer 430 to monitor the first multi-core processor 230, and the first path 450 does not go through the buffer 430.

Through the above-described configuration, the monitoring module 410 may operate in two modes.

The first mode is a bypass mode. In bypass mode, it may be connected between the monitoring module 410 and the first multi-core processor 230 through the first path 450 without passing through the buffer 430.

In bypass mode, the error monitoring processor 210 may monitor communication characteristics including communication speed (or throughput) and latency based on data bit of input data when inputting communication data, time required for monitoring (the difference between the data processing request time point (Task Request) and the response signal receiving time point (Task Response), and system operating frequency.

The communication speed (or throughput) may be calculated by the following Equation 1.

$$\text{Communication speed} = (f_s \times N_{task\ response} \times N_{data\ bit}) / T_{monitoring} \quad \text{(Equation 1)}$$

Here, $f_s$ indicates a system operating frequency. $N_{task}$ responses indicate the number of task responses to a data processing request from a particular time point. $N_{data\ bit}$ indicates the data bit of the input data. $T_{monitoring}$ indicates a time required for monitoring (i.e., the time taken from the time point at which data is transmitted from the error monitoring processor to the first multi-core processor 230 to the time point at which the data processing response is received from the error monitoring processor).

On the other hand, the delay rate may be calculated from the following Equation 2.

$$\text{Delay rate} = \text{data processing time} / N_{task\ responses} \quad \text{(Equation 2)}$$

Here, the data processing time means a difference between a data processing request time (see a and 1 in FIG. 3) and a response time point (Task Response, see d and 4 in FIG. 3) for a data processing request.

On the other hand, in the Quality of Service Mode (QoS mode), the monitoring module 410 may detect whether a problem is caused by a communication error or an operation error when a problem occurs.

In the QoS mode, the monitoring module 410 and the first multi-core processor 230 are connected through a second path 453 through the buffer 430.

In the QoS mode, when the error monitoring processor 210 needs to monitor the data received from the first multi-core processor 230, the data of the first multi-core processor 230 is written to the buffer 430. At this time, the error monitoring processor 210 measures the speed at which the buffer 430 is filled, that is, the time point at which the data overflows the buffer 430, and determines whether the time point is smaller than a predetermined communication request time.

In QoS mode, when the error monitoring processor 210 needs to monitor the data read operation of the first multi-core processor 230, the data in the buffer 430 is emptied. At this time, the error monitoring processor 210 measures the speed at which the buffer 430 is emptied, that is, the time point at which the data underflows the buffer 430, and determines whether the time point is smaller than a predetermined communication request time.

Figure 4:
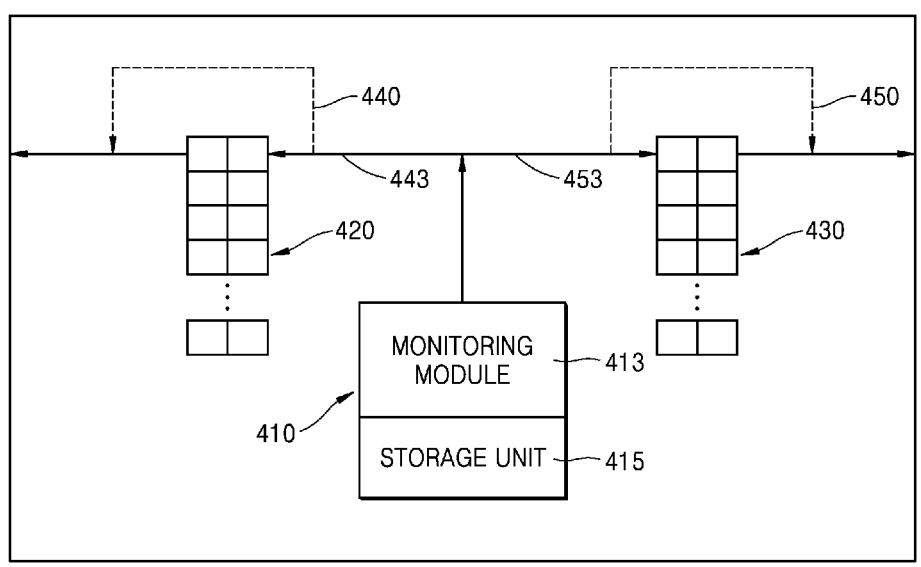

Since the total operation time (total response request time) means operation time+communication time, that is, 1+2+3+4 in FIG. 4 in the case of the first multi-core processor 230, the communication time (i.e., 1 and 4) may be known through the QoS mode.

In brief, through the QoS mode, the error monitoring processor 210 measures the read/write operation time of the buffer described above so that only the communication time may be calculated separately, and the operation time may be calculated by subtracting the communication time from the data processing time (the reception completion time point of 4 from the starting time point of 1). Especially, it is possible to check whether the writing error or the reading error is occurred in the communication time.

Accordingly, the error monitoring processor 210 may determine whether a communication error or an operation error is caused by a simple method without obtaining the processing time of each of the plurality of processors.

On the other hand, when the actual operation processing time from the data processing request time point to the response time point is not processed within the operation request time, the error monitoring processor 210 may increase the error counter by a predetermined value.

If the error counter exceeds a predetermined threshold, the error monitoring processor 210 may transmit an error occurrence signal to the multi-core processor in which the error occurred, among the plurality of processors 230 and 240. The error occurrence signal may be a flag signal indicating an error occurrence and a reset signal.

When the error monitoring system 200 according to an embodiment of the present invention is a system in which communication speed is important and the reason why the operation processing time is not processed within the operation request time is due to the operation performance consumed time, the error monitoring processor 210 increments the error counter by weighting the predetermined value. For example, when it is determined that the calculation time is important, the error monitoring processor 210 may increase the error counter by 1 at the time of the communication error and by 2 at the time of the operation error. That is, the error counter may be increased more by operation error than communication error.

Meanwhile, when the error monitoring system 200 according to an embodiment of the present invention is a system in which communication speed is important and the reason why the operation processing time is not processed within the operation request time is an error due to the communication time, the error monitoring processor 210 increments the error counter by weighting the predetermined value.

Moreover, if the error monitoring system according to another embodiment of the present invention is a system in which operation speed is important, the error monitoring processor calculates an operation processing time by adding a value obtained by adding a predetermined weight to the operation performance consumed time of each of the plurality of processors and a communication time from the error monitoring signal transmission time point to the updated error monitoring signal reception time point. If the operation processing time is not processed within the operation request time, the error monitoring processor increments the error counter by a predetermined value.

If the error counter exceeds a predetermined threshold, the error monitoring processor transmits an error occurrence signal to at least one processor that causes the error of the plurality of processors. The error occurrence signal includes a signal including a flag value indicating an error occurrence and a reset signal.

If the error monitoring system according to another embodiment of the present invention is a system in which communication speed is important, the error monitoring processor calculates the operation processing time by adding a value obtained by assigning a predetermined weight to the communication time from the error monitoring signal transmission time point to the updated error monitoring signal reception time point and the operation performance consumed time of each of the plurality of processors. If the operation processing time is not processed within the operation request time, the error monitoring processor increments the error counter by a predetermined value. If the error counter exceeds a predetermined threshold, the error monitoring processor transmits an error occurrence signal to at least one processor that causes the error of the plurality of processors. The error occurrence signal may include a signal including a flag value indicating an error occurrence and a reset signal.

Figure 5:
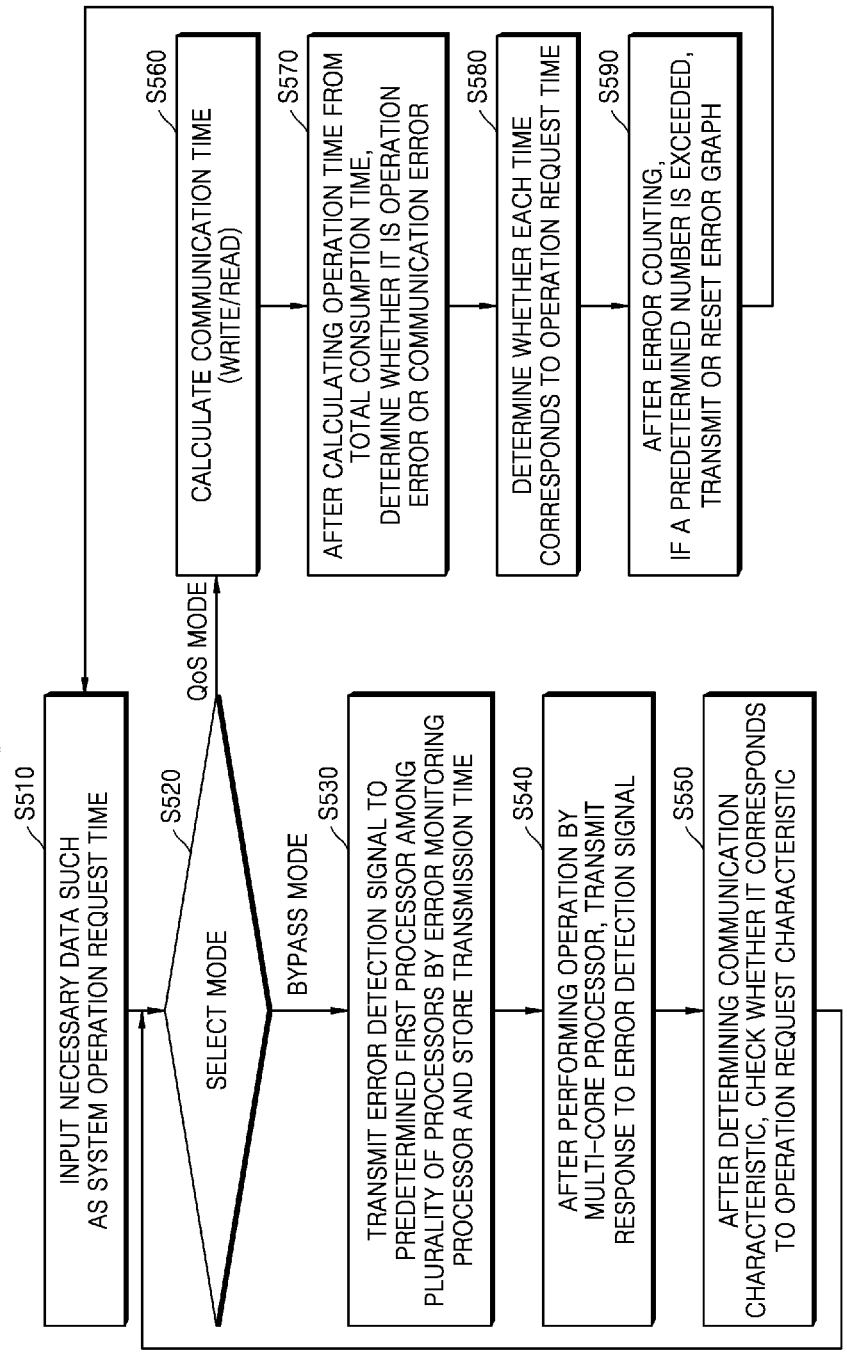
FIG. 5 is a flowchart of a multiple processor error monitoring method according to an embodiment of the present invention.

FIG. 5 is a flowchart of an error monitoring method according to an embodiment of the present invention.

In step S510, the error monitoring system 200 may receive data required for monitoring, such as a predetermined system operation request time, a system operation frequency, and communication data, from an external source, and store them.

In step S520, the error monitoring system 200 may select a mode. In this case, the mode includes a bypass mode and a QoS mode. For example, after monitoring an error in the bypass mode in the previous operation, if there is an error in the delay rate or the communication speed, the QoS mode may be selected and preceded. Alternatively, the bypass mode and the QoS mode may be repeatedly performed.

In step S530, when proceeding to bypass mode, the error monitoring system 200 transmits an error detection signal including a query to the first processors 320 and 340 of the multi-core processors 230 and 240 in the error monitoring processor 210 and stores the transmission time.

In step S540, the error monitoring system 200 performs the predetermined operation by each of the plurality of processors, and the error monitoring processor 210 receives the result of the operation performed and stores the reception time.

In step S550, the error monitoring system 200 grasps the communication characteristics including the communication speed and the delay rate based on the error detection signal transmission time and the calculation result reception time. At this time, it is confirmed whether or not the communication speed and the delay rate satisfy the operation request time. When the communication speed and the delay rate do not satisfy the operation request time, the QoS mode may be selected in the next mode selection.

On the other hand, in step S560, the error monitoring system 200 selects the QoS mode, calculates the read/write time using the buffer in the error monitoring processor 210, and calculates the communication time.

In addition, in step S570, the error monitoring system 200 may calculate the operation time excluding the communication time from the total operation time, and in step S580, it is determined whether each time (operation time and communication time) satisfies each operation request time.

In step S590, if each operation request time is not satisfied, the error monitoring system 200 performs error counting, and if the number of error counts exceeds a predetermined threshold value, may transmit an error flag to the corresponding multi-core processor or reset the corresponding multi-core processor.

After reset or error flag transmission, the error monitoring system 200 may again input the required data such as the system operation request time and repeat the monitoring.

According to the present invention, it is possible not only to identify a processing core in which a problem occurs in a multi-core system, but also to identify whether the cause of the problem is an operation error or a communication error.

Therefore, the multi-core error monitoring device according to the present invention not only assures the safety of the operation of the system, but also improves the work performance for solving the identified problem.

Although the present invention has been described with reference to the embodiments shown in the drawings, it is only illustrative, and it will be understood by those skilled in the art that various changes and modifications may be made without departing from the scope of the present invention. Accordingly, the true scope of the present invention should be determined by the technical idea of the appended claims.

What is claimed is:

1. A multi-core processor error monitoring system comprising:
    a first multi-core processor and a second multi-core processor; and
    an error monitoring processor configured to monitor the first and second multi-core processors,
    wherein the error monitoring processor comprises a monitoring module and a first buffer and a second buffer,
    wherein the monitoring module is connected to the first multi-core processor through a first path not passing through the first buffer and a second path passing through the first buffer,
    wherein the monitoring module calculates and monitors a communication characteristic with the first multi-core processor including a communication speed and a delay rate in a bypass mode in connection with the first multi-core processor through the first pass,
    wherein the monitoring module measures a read and write time of the first buffer in a Quality of Service (QoS) mode in connection with the first multi-core processor through the second pass to calculate a communication time with the first multi-core processor.

2. The system of claim 1, wherein the error monitoring processor transmits an error detection signal to the first multi-core processor and stores a transmission time point as a data processing request time point,
    wherein the first multi-core processor comprises a first processor and a second processor, and transmits a predetermined data processing result, which is obtained by performing by the first processor and the second processor based on the error detection signal, to the error monitoring processor as a response,
    wherein the error monitoring processor stores the predetermined data processing result response reception time and calculates an actual operation processing time based on the response reception time and the data processing request time point to monitor the communication characteristic.

3. The system of claim 2, wherein the error monitoring processor calculates an operation time and a communication time based on the actual operation processing time and the communication time calculated in the QoS mode, and compares the operation time and the communication time with a predetermined operation request time and a communication request time to check whether it is an operation error or a communication error.

4. The system of claim 3, wherein in the case of the operation error or the communication error, the error monitoring processor increments an error counter.

5. The system of claim 4, wherein the error monitoring processor increments the error counter by changing a weight according to the operation error or the communication error.

6. The system of claim 2, wherein if the actual operation processing time is greater than a predetermined operation request time, the error monitoring processor converts a bypass mode to a QoS mode and performs error monitoring.

7. The system of claim 2, wherein the delay rate in the bypass mode is calculated based on the actual operation processing time and the number of responses to a data processing request from a specific time point.

8. The system of claim 1, wherein the communication speed in the bypass mode is calculated based on a system operating frequency, the number of responses to a data processing request from a specific time point, a data bit of input data, and a time required for monitoring.

9. The system of claim 1, wherein in the QoS mode, the communication time is calculated based on a time point at which the first buffer overflows when the error monitoring processor needs to monitor data received from the first multi-core processor.

10. The system of claim 1, wherein in the QoS mode, the communication time is calculated based on a time point at which the first buffer underflows when the error monitoring processor needs to monitor a data read operation of the first multi-core processor.

11. A multi-core processor error monitoring method comprising:
    inputting data necessary for monitoring, which includes a system operation request time;
    selecting any one of a bypass mode and a QoS mode;
    transmitting an error detection signal to a first multi-core processor by an error monitoring processor in the bypass mode;
    performing a predetermined operation in the bypass mode by the first multi-core processor and then, transmitting a response to an error detection signal;
    obtaining a communication characteristic including a communication speed and a delay rate based on the response time point by the error monitoring processor in the bypass mode and then, checking that it corresponds to an operation request characteristic;
    calculating a communication time with the first multi-core processor using a first buffer in the QoS mode; and
    determining whether it is a communication error or an operation error based on the communication time.

12. The method of claim 11, wherein the transmitting of the error detection signal in the bypass mode comprises transmitting, by the error monitoring processor, the error detection signal to the first multi-core processor and storing a transmission time point as a data processing request time point,
    wherein the transmitting of the response to the error detection signal in the bypass mode comprises transmitting, by the first multi-core processor, a predetermined data processing result, which is performed by a first processor and a second processor of the first multi-core processor based on the error detection signal, to the error monitoring processor as a response,
    wherein the checking whether it corresponds to the operation request characteristic after determining the communication characteristic comprises storing, by the error monitoring processor, the predetermined data processing result response reception time, and calculating an actual operation processing time based on the response reception time and the data processing request time point to monitor the communication characteristic.

13. The method of claim 12, further comprising calculating, by the error monitoring processor, an operation time and a communication time based on the actual operation processing time and the communication time calculated in the QoS mode, and comparing the operation time and the communication time with a predetermined operation request time and a communication request time to check whether it is an operation error or a communication error.

14. The method of claim 13, further comprising incrementing, by the error monitoring processor, an error counter in the case of the operation error or the communication error.

15. The method of claim 14, wherein the incrementing of the error counter comprises incrementing, by the error monitoring processor, the error counter by changing a weight according to the operation error or the communication error.

16. The method of claim 12, further comprising, if the actual operation processing time is greater than a predetermined operation request time, converting, by the error monitoring processor, a bypass mode to a QoS mode and performs error monitoring.

17. The method of claim 12, wherein the delay rate in the bypass mode is calculated based on the actual operation processing time and the number of responses to a data processing request from a specific time point.

18. The method of claim 11, wherein the communication speed in the bypass mode is calculated based on a system operating frequency, the number of responses to a data processing request from a specific time point, a data bit of input data, and a time required for monitoring.

19. The method of claim 11, wherein in the QoS mode, the communication time is calculated based on a time point at which the first buffer overflows when the error monitoring processor needs to monitor data received from the first multi-core processor.

20. The method of claim 11, wherein in the QoS mode, the communication time is calculated based on a time point at which the first buffer underflows when the error monitoring processor needs to monitor a data read operation of the first multi-core processor.

* * * * *